United States Patent [19]
Aaland et al.

[11] 3,722,178
[45] Mar. 27, 1973

[54] SULFUR TRIOXIDE VAPOR FOR DUST CONDITIONING

[76] Inventors: Harold H. Aaland, 12653 Killion Street, N., Hollywood, Calif. 91607; James L. Ma, 2341 Dunswell Avenue, Hacienda Heights, Calif. 91745

[22] Filed: June 24, 1971

[21] Appl. No.: 156,266

[52] U.S. Cl. ............................55/4, 55/5, 55/106, 55/134
[51] Int. Cl. ...........................................B03c 3/01
[58] Field of Search............55/4, 5, 6, 7, 8, 9, 10, 11, 55/106, 122, 134, 135

[56] References Cited

UNITED STATES PATENTS

| 1,441,713 | 1/1923 | Prosser | 55/5 |
| 2,602,734 | 7/1952 | Hedberg et al. | 75/1 |

FOREIGN PATENTS OR APPLICATIONS

| 700,869 | 12/1964 | Canada | 55/5 |
| 134,593 | 10/1919 | Great Britain | 55/11 |

*Primary Examiner*—Dennis E. Talbert, Jr.
*Attorney*—E. Wallace Breisch

[57] ABSTRACT

A process and apparatus for heating, vaporizing and decomposing sulfuric acid for production of sulfur trioxide to be used in conditioning stack gases to be treated in an electrostatic precipitator.

10 Claims, 2 Drawing Figures

SULFUR TRIOXIDE VAPOR FOR DUST CONDITIONING

In the science of dust collection by the electrostatic precipitation technique, it is well known that the collection efficiency is affected by the resistivity of dust. If the resistivity is below a desired value there is not enough charge in the dust to produce a strong force for attraction by the collector plate. On the other hand, if the resistivity of the particle is too high, for example above about 20 billion ohm-centimeters the dust builds up a voltage differential on the collecting plates, reducing the effective voltage applied to the system so that the corona current discharge is reduced and the collection efficiency falls.

It is well known that high resistivity dusts are produced in burning low sulfur coals, as shown by White (H. J. White) "Industrial Electrostatic Precipitation," Addison-Wesley Publishing Company, page 314, 1962) wherein plant G is shown to have produced fly ash of average 80 billion ohm-centimeters resistivity at 300°F when burning low sulfur coal and the same plant yields fly ash of an average 5 billion ohm-centimeters resistivity at the same temperature when burning high sulfur coal.

Because of the need to reduce sulfur dioxide emission from coal burning power plants, low sulfur coal is now much in demand as the fuel. At the same time, the restriction on particle emission is becoming more stringent and a higher collection efficiency is required from the electrostatic precipitator.

In order to reduce the resistivity of the dust for better collection efficiency it has been found by many investigators that the addition of a few parts per million of sulfur trioxide or sulfuric acid vapor into the flue gas stream reduces resistivity of the dust and increases collection efficiency. One method of producing the sulfur trioxide for dust conditioning is to vaporize stabilized or unstablized liquid sulfur trioxide in the flue gas. However, liquid sulfur trioxide is very difficult to handle because of narrow temperature range in which it remains as a liquid. It boils at 113°F and freezes at 61°F and when frozen it tends to polymerize and cannot be remelted to liquid sulfur trioxide again. It fumes profusely as it comes into contact with moisture in the air, becoming sulfuric acid vapor which is very corrosive and toxic. From a safety standpoint it is a dangerous material to both personnel and equipment.

A second method for generating sulfur trioxide is to burn sulfur by air to produce sulfur dioxide, which is then catalytically converted into sulfur trioxide. To produce sulfur trioxide by this method the equipment is very complicated, requiring much operator attention and a catalyst which also requires periodic replacement and rejuvenation entailing plant shutdowns and high maintenance costs.

A third method is to vaporize sulfur trioxide from fuming sulfuric acid or oleum, however, the rate of evaporation drops off rapidly as the percentage of sulfur trioxide in the oleum is decreased and the evaporation cannot be economically carried below 20 percent of sulfur trioxide in the oleum. Oleum is very corrosive and similar to liquid or vapor sulfur trioxide, it fumes profusely when it comes in contact with moist air and the disposal of the depleted oleum is very difficult making it undesirable to use oleum in stack gas conditioning.

The present invention discloses a process and apparatus for the production of sulfur trioxide for stack gas conditioning. The process consists of vaporizing and decomposing concentrated sulfuric acid (92 to 98%) by a stream of hot air according to the following equation:

Sulfuric acid plus heat (840°F) yields sulfur trioxide and water

The object is to supply necessary heat required for raising the temperature, vaporizing and decomposing the liquid sulfuric acid by direct contact of the acid with a stream of hot air produced by combustion of a hydrocarbon fuel and an excess of fresh air. It is to be noted that in this method the sulfuric acid is not hot until the moment when it is converted into sulfur trioxide and water vapors which are not as corrosive as the hot acid. It should also be noted that in the presence of air the dew point of the acid vapor is reduced, therefore, if required, the temperature of the gas mixture can be lowered by 200° or 300°F without causing condensation of the acid. Also in this method since the acid comes in contact directly with the combustion gas the heat transfer is very effective especially in a countercurrent, packed evaporator of this invention.

These and other advantages will become more apparent upon consideration of the following description and drawings in which.

Figure 1:
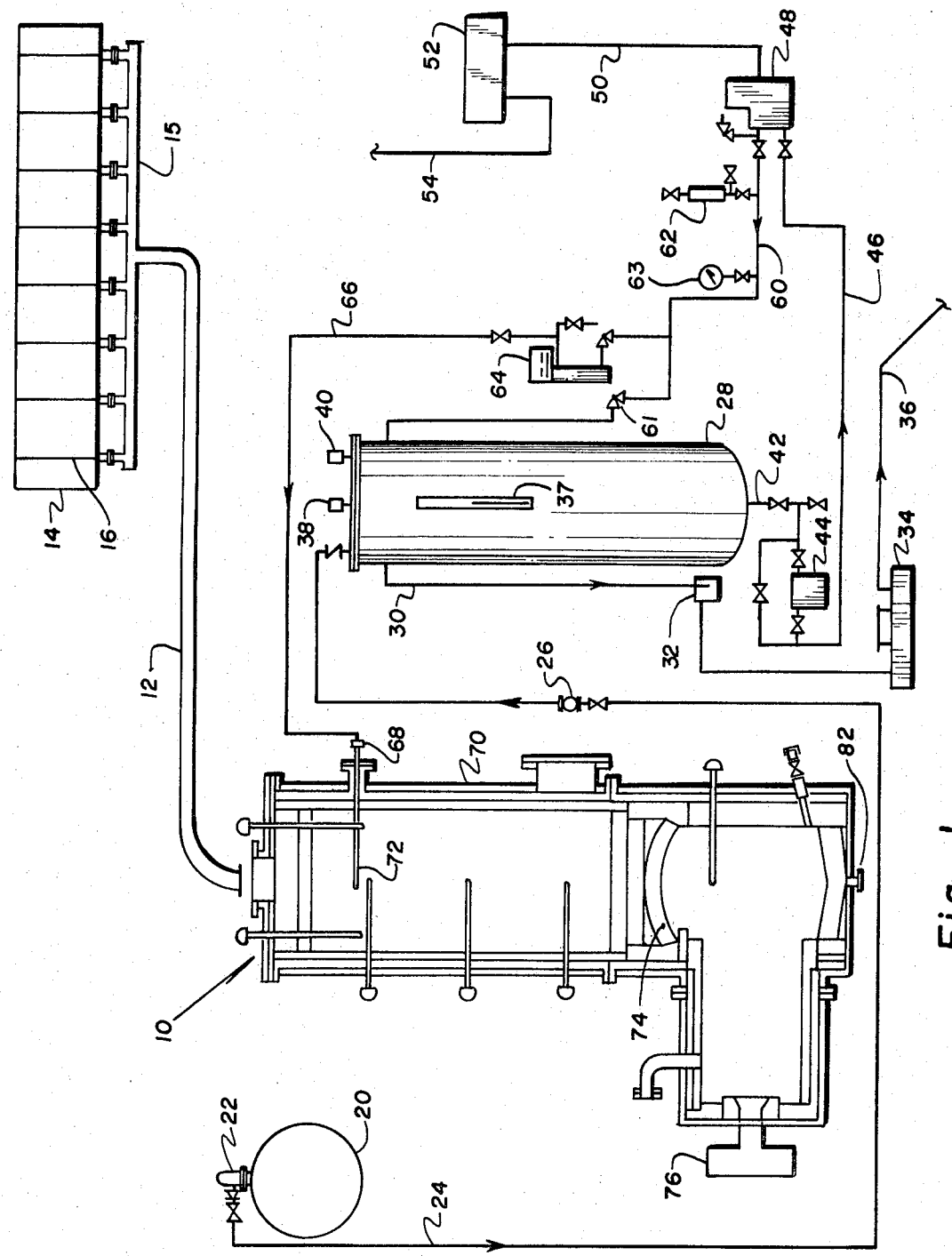
FIG. 1 is a schematic representation of the apparatus of this invention including fluid conducting lines and basic controls for fluid flow therethrough.

In FIG. 1 there is schematically shown an acid vaporizing system generally indicated at 10 connected by a vapor line 12 (shown on a reduced scale) to a portion of the stack duct work such as a flue 14 at some point between the boilers and precipitators (not shown) of, for example, a power plant typically of a capacity of approximately 160 megawatts of electricity. The connection of the vapor line 12 to the duct work flue 14 is accomplished by way of a manifold 15 feeding a plurality (shown as 8) of nozzles 16 extending substantially all the way across the flue 14 with side looking perforations in the nozzle 16 suitable for wide distribution of the vapor into the flue gases moving through the duct work. Typically the portion of the duct work in which the nozzle 16 will be located will be immediately upstream of the breachings leading to the precipitators and the nozzles will be so located that every part of the flue gas moving through the duct work past the nozzles 16 will be exposed to the action of the vapors from the nozzles.

The mixture of hot air, water vapor and sulfur trioxide to be distributed by the nozzles is produced by the rest of the apparatus shown in FIG. 1 or some equivalent structure for producing the same mixture of gases.

Such apparatus comprises an acid storage tank 20 having mounted thereon a delivery pump 22 of any suitable type feeding through a supply line 24 by way of a sight flow 26, and including suitable valving for shutting off or isolating line 24, to a feed tank 28 having an entrance typically at the top of such tank. An overflow line 30 emerging from an upper area of the feed tank communicates through an oil seal vapor trap 32 with a sump tank 34 normally filled with limestone to neutralize any acid that should overflow and having an overflow line 36 for delivery of the neutralized acid to a sewer or other suitable means of disposal (not shown). The feed tank 28 is also typically provided with a vertically elongated sight glass 37 of a well known type to give visual indication of the acid level within the feed tank 28. At the top of the feed tank 28 is a moisture trap vent of a usual design 38 to maintain atmospheric pressure within the feed tank 28 in the usual manner while excluding water droplets or mist. Also at the top of the feed tank 28 is a level control 49 electrically interconnected with pump 22 of the storage tank 20 to provide the usual operation of the pump 22 to refill the feed tank when depleted to a preselected level and to stop the pump 22 when the acid level in the feed tank 28 has risen to preselected desired height.

At the bottom of the feed tank 28 an outlet line 42, suitably valved, communicates through a filter 44 and a supply line 46 with a metering pump 48 of a type well known in the art wherein a suitable pneumatic control operator 52 supplying pressurized air to the metering pump 48 through a line 50 can vary the delivery rate of the pump 48 from 0 up to typically something on the order of 20 gallons per hour of acid at a carefully controlled rate determined by an electrical signal received by the pneumatic operator via a conductor 54 transmitting a signal from a boiler capacity index gage (not shown) which provides a signal proportional to the boiler load usually measured in terms of the rate of electric power generation at a particular time. A delivery line 60 from the pump 48, provided with a surge chamber 62 for smoothing out the flow of acid through line 60 and also provided with a pressure gage 63 for visual indication of pressure in the delivery line, feeds acid by way of a flow indicator 64, through a feed line 66 and a tower connection 68 into the upper area of a packed vaporizer tower 70 by way of an open nozzle 72. Below the nozzle 72 is an acid distributor (not shown) of conventional design for the purpose of distributing the acid supplied through the nozzle 72 over the whole cross-sectional area of the interior of the tower 70.

The tower 70 is made of heat resistant steel and internally lined with acid resistant bricks, as for instance two courses of 2½ inch thick acid book brick fitted together in the usual manner. The interior of the tower is filled with ceramic tower packings such as Raschig rings, Intalox saddles or the like of the conventional types that promote good heat and mass transfer between rising hot air and liquid acid coming down from the distributor. The height of the packing is selected to achieve complete vaporization of the acid before it has a chance to reach the bottom of the packings, which height at a superficial air velocity of 8 feet per second upward through the vaporizer requires a minimum packing height of 3 feet. At less than this height both the mass and heat transfer rates will be poor and some acid might drip through into the bottom of the vaporizer tower 70. Excessive packing height is to be avoided because it causes higher pressure drop and increases fan cost and in a properly designed acid distributor a packing height of 5 feet should suffice.

Figure 2:
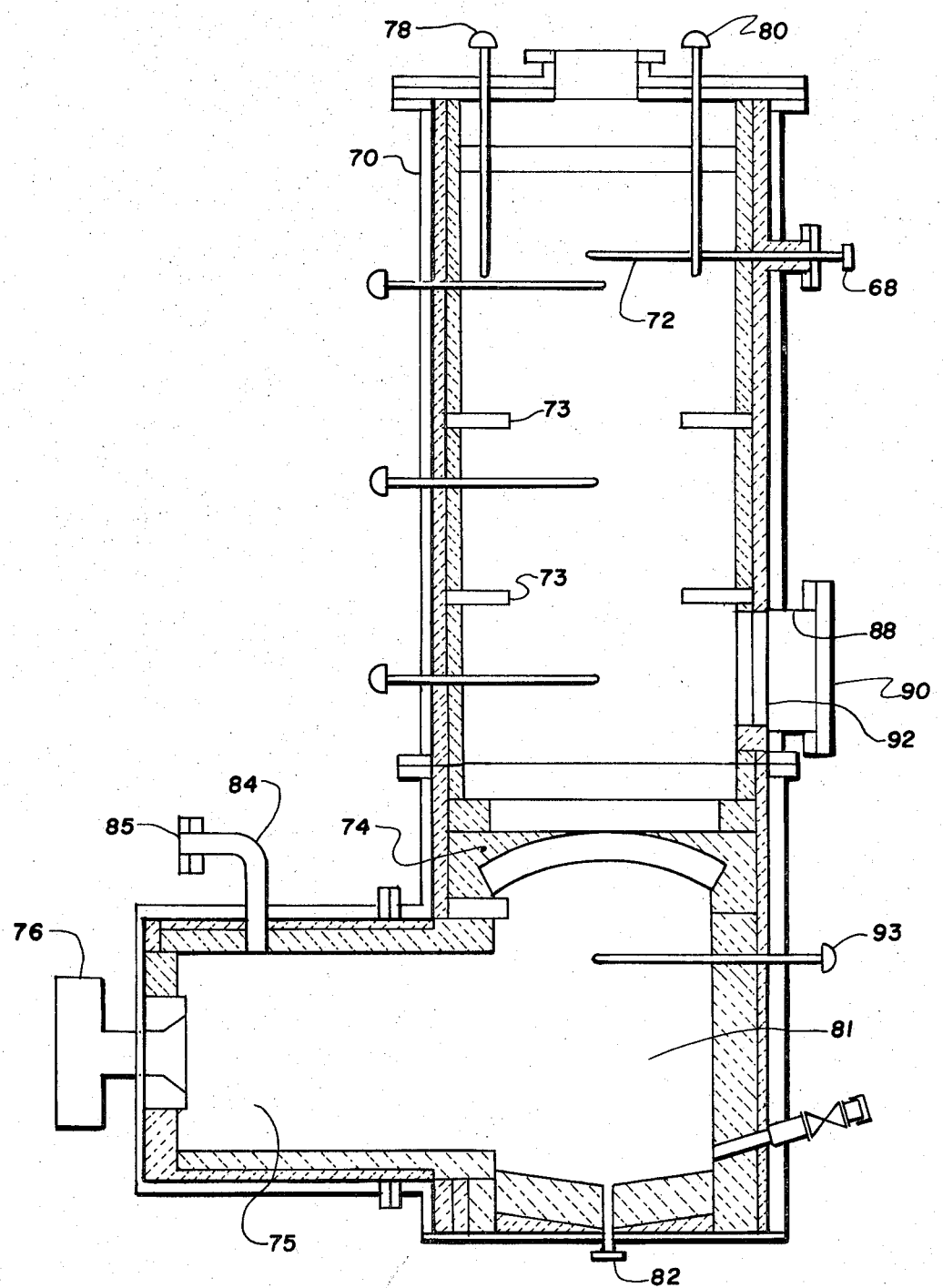
FIG. 2 is a more detailed representation of a countercurrent packed evaporator constructed according to the principles of this invention and shown on a larger scale.

A packing support assembly 74 preferably made of heat and acid resistant ceramic material must be designed to support the packing without failure during the heating and cooling of the vaporizer and must be provided with perforations in the support plate that allow free passage of the air without creating a big pressure drop. As best seen in FIG. 2 the tower 70 is based on a horizontally extending combustion chamber 75 provided at its left end, as seen in FIG. 2, with a conventional high capacity burner 76 wherein the hot air to the vaporizer is produced by mixing fresh air with combustion gas from burning natural gas or oil in the combustion chamber 75 with the amount of gas admitted into the combustion chamber automatically controlled by the exit temperature of the gas mixture from the top or bottom of the vaporizer by way of a temperature controller 78 or 93 mounted in the tower in the path of the flowing vapors with an additional control by a temperature cut off 80 similarly mounted in the top of the tower 70 which cuts off all supply of fuel to the burner 76 when the temperature of the gases at the top of the tower exceeds a preselected maximum allowable value. At the bottom of the tower 70 there is provided a drain portion 81 wherein any unvaporized acid dripping through the support assembly 74 will be collected and conducted to a drain line 82 which can be connected to the sump tank 34 or by way of suitable filters and residue tank (not shown) can be connected to the feed line 46 to be recirculated through the metering pump 48.

Also communicating with the combustion chamber 75 is a safety connection 84 extending outwardly from the combustion chamber to a rupture disk 85 made of frangible material so that in case of an explosion within the combustion chamber 75 excessive pressure will not apply upwardly through the tower but will be allowed to escape through the fractured rupture disk 85 before damage can be done to the support assembly 74 or any other portion of the tower.

It is further to be noted that near the bottom of the tower portion 70 there is an access port or manhole 88 extending through the side of the tower 70 and the brick lining but closed with a cap 90 protected from the acid vapors by a sealing partition 92 made up of bricks and mortar in the approved fashion which can be removed in case it is necessary to remove the tower packing for cleaning or replacement.

To begin operating the acid vaporizing system of this invention concentrated sulfuric acid (92 to 98 percent pure) from the storage tank 20 is transferred by the tank pump 22 into the acid feed tank 28 by way of the feed line 24 and the flow sight 26. The tank 28 is externally heated to prevent the acid from freezing in the wintertime and actually the acid temperature in the feed tank 28 is maintained at 100° to 150°F by a suitable temperature controller (not shown) which operates a switch to turn on and off electricity going through heating pads on the external surface of the feed tank 28. The acid level in the feed tank is maintained by the level controller 40 which automatically switches on or off the tank pump 22 at predetermined high and low levels in the acid tank 28.

The acid is withdrawn from the feed tank 28 by way of the line 42 through the filter 44 and line 46 into the precalibrated metering pump 48. The metering pump delivers a controlled volume of acid to the vaporizer in proportion to the amount of flue gas from the boiler measured in terms of the electrical output being generated at a particular time. As the production of flue gas changes in the boiler system the proper ratio of acid to the flue gas (5 to 50 parts per million) is automatically maintained because of the pneumatic control operator 52 responsive to the signal coming from the boiler capacity index gage to the connection 54. The discharge pressure of the pump 48 will be shown on the pressure gage 63 and the surges due to the action of the metering pump will be smoothed out by the well known action of the surge chamber 62 so that there is a smooth flow of acid through the flow indicators 64 and the feed line 66 to the tower 70 through the open nozzle 72 at the top of the tower. From the nozzle 72 the acid passes through some typical distributor (not shown) to assure wide distribution of the acid over the ceramic packing throughout the whole cross sectional area of the tower. To prevent acid flow down the inside walls of the tower 70 a pair of redistribution rings 73 is located within the tower in a manner well known in the art. From the distributor the acid drips onto the ceramic packings in the vaporizer to achieve intimate contact between the acid and the hot air in countercurrent flow. As the acid comes in contact with the hot air it is heated, vaporized and dissociated into sulfur trioxide and water vapor with the degree of dissociation a function of temperature with an acceptably high dissociation percentage above 800°F and substantially 100 percent dissociation at 842°F and above. However, if the temperature is too high, the sulfur trioxide starts to decompose into sulfur dioxide and oxygen with well known deleterious results. This undesirable decomposition begins to be appreciable above 932°F therefore the operating temperature in the vaporizer must be maintained in the range of 842° to 932°F. This temperature is controlled by the temperature of the hot air coming from the air heater or burner 76 but since the temperature of the air is rapidly reduced by the heating and evaporation of the acid over the packing there is no great risk as long as the temperature below the support assembly 74 does not exceed 1,100°F. The higher the incoming air temperature the smaller the quantity of air required for the complete vaporization of the acid supplied, however, the temperature cut-off 80 is set to shut off the burner 76 whenever the temperature at the top of tower 70 reaches 1,200°F since this exceeds the 932°F at which substantial amounts of sulfur trioxide will undesirably decompose into sulfur dioxide and oxygen and damage to the equipment may result from the high temperatures.

The combustion gas from the hot air heater must not be high in carbon monoxide content since carbon monoxide will reduce sulfur trioxide to sulfur dioxide stoichiometrically so that the presence of any carbon monoxide means loss of conversion efficiency.

From the vaporizer the hot gases containing vaporized and dissociated sulfur trioxide and water vapor along with air and combustion products are piped into the flue duct 14 of the boiler at some point upstream from the precipitator.

It is very important that the temperature of the hot gases in the vapor line 12 do not drop below the dew point of sulfur trioxide and water vapor before they reach the flue duct. To prevent such temperature drop the pipe is electrically traced and heavily insulated and provided with temperature control (not shown) to keep the temperature loss in the mixture of gases below 250°F. The hot gases from vapor line 12 are directed by the manifold 15 into the various distribution nozzles 16 so placed that there is a minimum of one injection point for each 4 square feet of the cross sectional area of the ducting at the point of injection. If the flue gas has much swirling and channeling more distribution points will be required and the injection nozzles modified accordingly.

With the mixture of hot gases coming in contact with the flue dust a sulfuric acid mist will be formed on the surface of the dust particles reducing their resistivity to an acceptable figure which is the object of the invention hereinbefore described.

What is claimed is:

1. The method of preconditioning flue gas to be treated in electrostatic precipitators, comprising the steps of; introducing a measured flow of concentrated sulfuric acid into a reaction vessel, contacting said flow of acid with a temperature controlled stream of hot gases flowing through said vessel countercurrently to said flow of acid to simultaneously produce a temperature controlled predetermined amount of sulfur trioxide and water vapor by dissociation of said acid and to produce a temperature controlled mixture of said sulfur trioxide and said water vapor with said hot gases, introducing said mixture into a stream of said flue gas to reduce the resistivity of the particulate solids carried by said flue gas.

2. The method of preconditioning flue gas as specified in claim 1 wherein said stream of hot gases includes combustion products from hydrocarbon fuel and an excess of air.

3. The method of preconditioning flue gas as specified in claim 1 wherein the temperature of said stream of hot gases is in the range of 1,000° to 1,200°F.

4. The method of preconditioning flue gas as specified in claim 1 wherein the temperature of said mixture is maintained with less than 250°F drop in temperature until said introducing step.

5. The method of preconditioning flue gas as specified in claim 1 wherein said flow of sulfuric acid is varied in relation to the amount of said flue gas being produced.

6. The method of preconditioning flue gas as specified in claim 5 wherein the amount of flue gas being produced is related to the electric power output of a power plant.

7. The method of preconditioning flue gas as specified in claim 1 comprising the additional step of conducting the combined flow of said flue gas and said mixture into at least one electrostatic precipitator.

8. The method of preconditioning flue gas as specified in claim 1 wherein said counter-current flow of hot air is upward through said vessel while the flow of said acid is downward by gravity through said vessel.

9. The method of preconditioning flue gas as specified in claim 1 wherein said measured flow of sulfuric acid is controlled to provide a ratio of said acid to said flue gas in the range of 5 to 50 parts per million.

10. The method of preconditioning flue gas as specified in claim 1 wherein said concentrated sulfuric acid is in the range of 92 to 98 percent pure acid.

* * * * *